United States Patent [19]

Weih et al.

[11] Patent Number: 5,496,884
[45] Date of Patent: * Mar. 5, 1996

[54] AQUEOUS ADHESIVE FOR BONDING ELASTOMERS

[75] Inventors: Mark A. Weih, Edinboro; Helmut W. Kucera, West Springfield; Patrick A. Warren, Erie; Douglas H. Mowrey, Pleasantville, all of Pa.

[73] Assignee: Lord Corporation, Cary, N.C.

[*] Notice: The portion of the term of this patent subsequent to Apr. 6, 2010, has been disclaimed.

[21] Appl. No.: 152,112

[22] Filed: Nov. 12, 1993

[51] Int. Cl.$^6$ ................................................ C08L 29/04
[52] U.S. Cl. ................ 524/503; 524/459; 524/502; 524/507; 524/508; 524/509; 524/510; 524/512
[58] Field of Search .................... 524/502, 503, 524/459, 508, 509, 510, 507, 512, 531

[56] References Cited

U.S. PATENT DOCUMENTS

| | | | |
|---|---|---|---|
| 3,377,313 | 4/1968 | Jupa et al. | 524/502 X |
| 3,640,941 | 2/1972 | Findley et al. | 260/33.6 |
| 3,920,600 | 11/1975 | Ahramjian | 260/29.7 UA |
| 4,128,514 | 12/1978 | Fitzgerald | 260/17 A |
| 4,167,500 | 9/1979 | Jazenski et al. | 260/29.3 |
| 4,341,668 | 7/1982 | Martin et al. | 524/502 X |
| 4,438,232 | 3/1984 | Lee | 524/502 X |
| 4,461,858 | 7/1984 | Adelman | 524/502 X |
| 4,483,962 | 11/1984 | Sadowski | 524/552 |
| 4,508,862 | 4/1985 | Schmidt | 524/502 X |
| 4,746,695 | 5/1988 | Berly | 524/503 X |
| 4,767,816 | 8/1988 | Jacoviello et al. | 524/503 X |
| 4,791,159 | 12/1988 | Dulaney et al. | 524/503 X |
| 4,859,717 | 8/1989 | Hoskin et al. | 524/503 X |
| 4,988,753 | 1/1991 | Rullmann et al. | 524/260 |
| 5,036,122 | 7/1991 | Auerbach et al. | 524/259 |
| 5,200,455 | 4/1993 | Warren | 524/503 X |
| 5,200,459 | 4/1993 | Weih et al. | 524/459 |
| 5,308,910 | 5/1994 | Yuki et al. | 524/503 |

FOREIGN PATENT DOCUMENTS

| | | | |
|---|---|---|---|
| 0451998 | 10/1991 | European Pat. Off. | 524/459 |
| 1469993 | 4/1977 | United Kingdom . | |

*Primary Examiner*—Judy M. Reddick
*Attorney, Agent, or Firm*—Wayne W. Rupert

[57] ABSTRACT

An adhesive composition containing a polyvinyl alcohol-stabilized butadiene polymer latex and a methylene donor compound. The butadiene polymer latex is prepared by an emulsion polymerization in the presence of polyvinyl alcohol. The adhesive composition may also contain other optional ingredients such as a supplemental polymeric film-forming component, a nitroso compound crosslinker, a maleimide compound crosslinker, a vulcanizing agent, and an acid-scavenging compound. The polyvinyl alcohol-stabilized butadiene polymer latex and methylene donor compound combine to provide a tightly crosslinked, robust film which provides for excellent adhesion and environmental resistance.

17 Claims, No Drawings

5,496,884

AQUEOUS ADHESIVE FOR BONDING ELASTOMERS

FIELD OF THE INVENTION

The present invention relates to compositions of matter useful for bonding various substrates such as elastomeric materials. More specifically, the present invention relates to environmentally resistant aqueous adhesive compositions based on polyvinyl alcohol-stablized butadiene polymer latices and methylene donor compounds.

BACKGROUND OF THE INVENTION

In light of the increasing awareness for environmental protection and workplace safety, a current major thrust of the adhesives industry is to develop an adhesive composition which avoids the use of highly volatile organic solvents which can cause damage to the environment and potentially affect the health of workers exposed to the solvent. It has thus far been relatively difficult to develop an aqueous adhesive which performs at a level equal to traditional solvent-based adhesives. One major problem associated with bonds formed from aqueous adhesives is the relative susceptibility of the bonds to high temperature fluids and corrosive materials. In applications involving the bonding of elastomeric substrates to surfaces such as metal surfaces, an aqueous adhesive must exhibit an affinity for the elastomeric substrate as well as possess the ability to withstand degradation by high temperature fluids or corrosive materials.

Various aqueous adhesives for bonding elastomeric materials have been developed in a continuing effort to obtain the ultimate aqueous adhesive for bonding elastomeric substrates. For example, U.S. Pat. No. 4,167,500 describes an aqueous adhesive composition that contains a water dispersible novolak phenolic resin, a methylene donor such as an acetal homopolymer or acetal copolymer, and water. The phenolic resins described are primarily derived from resorcinol and alkylphenols such as p-nonylphenol although various other polyhydroxy phenols are mentioned, such as phloroglucinol and pyrogallol.

U.S. Pat. No. 4,483,962 describes a terpolymer latex of an emulsion polymerized terpolymer of at least one 2,3-dihalo-1,3-butadiene monomer, at least one monoalkenyl aromatic alkylhalide monomer, and at least one olefinically unsaturated monomer. The terpolymer latex utilizes a surfactant such as an anionic surfactant or a mixture of an anionic surfactant and a non-anionic surfactant.

U.S. Pat. No. 4,988,753 describes an aqueous bonding composition containing (1) a mixture of chlorosulfonated polyethylene and vinyl chloride/vinylidene chloride/acrylic acid copolymer, (2) an organic polynitroso compound, and (3) a coreactive compound selected from diallyl acrylamide and phenylene bis-maleic acid imide. The adhesive composition may also optionally contain adhesion promoters, fillers, and processing aids.

U.S. Pat. No. 5,036,122 describes an aqueous adhesive composition which is a blend of a latex of a polymerized conjugated diene, a poly-C-nitroso compound, and a polymaleimide compound which is a polymer of a bismaleimide.

Many of the previously developed aqueous adhesive compositions such as those described above do not provide adhesive performance at the same level as traditional solvent-based adhesive compositions. A need currently exists for an aqueous adhesive composition that will exhibit substantial affinity for an elastomeric substrate as well as produce a bond that will withstand harsh environmental conditions such as those caused by high temperature fluids and corrosive materials.

SUMMARY OF THE INVENTION

The present invention is an aqueous adhesive composition that exhibits substantial affinity for an elastomeric substrate and that produces an environmentally resistant adhesive bond. The adhesive composition of the present invention comprises a polyvinyl alcohol-stabilized butadiene polymer latex in combination with a methylene donor compound. The latices utilized in the present invention can be prepared by the emulsion polymerization of butadiene monomers, or a combination of butadiene monomers and additional copolymerizable monomers in the presence of polyvinyl alcohol. More specifically, the latices of the present invention are prepared by initiating and maintaining free radical polymerization of the appropriate monomers in an aqueous suspension of polyvinyl alcohol. A butadiene homopolymer may be prepared by utilizing a butadiene monomer such as 2,3-dichloro-1,3-butadiene, or a copolymer or terpolymer of polybutadiene monomers may be produced by copolymerizing a combination of butadiene monomers or by copolymerizing one or more butadiene monomers with other copolymerizable monomers. Examples of other copolymerizable monomers include α-haloacrylonitrile, acrylic acid, methacrylic acid, and styrene sulfonic acid.

It has presently been discovered that the combination of the methylene donor compound and the polyvinyl alcohol-stabilized butadiene polymer latex results in an adhesive composition which exhibits an unexpected improvement in bonding performance, particularly with respect to resistance to high temperature fluids and corrosive materials. It is believed that the methylene donor compound synergistically reacts with the hydroxyl groups inherent in the polyvinyl alcohol network of the stabilized latex to produce a tightly crosslinked, robust film which provides for excellent adhesion and environmental resistance.

DETAILED DESCRIPTION OF THE INVENTION

The butadiene latices of the present invention can be prepared by polymerizing appropriate monomers in an aqueous solution of polyvinyl alcohol. The butadiene polymer of the present invention can be prepared from butadiene monomers alone or from a combination of butadiene monomers and other copolymerizable monomers described in more detail below. "Butadiene polymer," therefore, herein refers to butadiene homopolymers, butadiene copolymers, butadiene terpolymers and higher polymers.

The butadiene monomers useful for preparing the butadiene polymer of the latex of the present invention can essentially be any monomer containing conjugated unsaturation. Typical monomers include 2,3-dichloro- 1,3-butadiene; 1,3-butadiene; 2,3-dibromo- 1,3-butadiene; isoprene; 2,3-dimethylbutadiene; chloroprene; bromoprene; 2,3-dibromo-1,3-butadiene; 1,1,2-trichlorobutadiene; cyanoprene; hexachlorobutadiene and combinations thereof. It is particularly preferred to use 2,3-dichloro- 1,3-butadiene as the butadiene monomer of the present invention since butadiene homopolymers derived from 2,3-dichloro-1,3-butadiene or butadiene copolymers wherein a major portion of the polymer contains 2,3-dichloro-1,3-butadiene monomer units have been found to be particularly useful in adhesive applications due to the excellent bonding ability and barrier properties of the 2,3-dichloro-1,3-butadiene-based polymers.

"Copolymerizable monomers" herein refers to monomers which are capable of undergoing copolymerization with the butadiene monomers described above. Typical copolymerizable monomers useful in the present invention include a-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; styrene; styrene sulfonic acid; α-halostyrenes; chlorostyrene; αmethylstyrene; α-bromovinylketone; vinylidene chloride; vinyl toluenes; vinylnaphthalenes; vinyl ethers, esters, and ketones such as methyl vinyl ether, vinyl acetate, and methyl vinyl ketone; esters, amides, and nitriles of acrylic and methacrylic acids such as ethyl acrylate, methyl methacrylate, glycidyl acrylate, methacrylamide, and acrylonitrile; and combinations of such monomers.

The copolymerizable monomers, if utilized, are preferably α-halo-acrylonitrile and/or α,β-unsaturated carboxylic acid monomers. The copolymerizable monomers are utilized in an amount ranging from about 0.1 to 30, percent by weight of the total monomers utilized to form the butadiene polymer.

Two butadiene polymers which have been found to be particularly useful in adhesive applications include a butadiene copolymer prepared from butadiene monomers and α-halo-acrylonitrile monomers wherein the α-haloacrylonitrile monomers comprise from about 1 to 29, preferably about 5 to 20, percent by weight of the total monomers, and a butadiene terpolymer prepared from butadiene monomers, α-haloacrylonitrile monomers, and α,β-unsaturated carboxylic acid monomers, wherein the α-haloacrylo-nitrile monomers comprise from about 1 to 29, preferably about 5 to 20, percent by weight and the α,β-unsaturated carboxylic acid monomers comprise from about 0.1 to 10, preferably about 0.1 to 1, percent by weight of the total monomers utilized.

The polyvinyl alcohol (PVA) of the present invention can be any PVA, commercially or otherwise available, which will dissolve in the present aqueous polymerization system at the temperature of the polymerization. Such PVA will usually be the product of hydrolysis of polyvinyl acetate, wherein the degree of hydrolysis is preferably about 80–99 percent. The average degree of polymerization of the PVA will be about 350–2,500. For a general discussion of various PVAs, see The Encyclopedia of Polymer Science and Technology, Interscience Publishers, Vol. 14, pp. 149ff, (1971). The preferred proportion of PVA is about 3 to 12, preferably about 6 to 8, parts per 100 parts by weight of total monomers. The PVA acts as an emulsion stabilizer during the polymerization.

It is presently preferred to utilize a stabilizing solvent in combination with the polyvinyl alcohol when preparing the latices of the present invention. The stabilizing solvent useful for preparing the improved latices of the present invention which are useful in adhesive applications can essentially be any organic solvent capable of exhibiting miscibility with water. The solvent is preferably an organic alcohol such as methanol; ethanol; isopropanol; butanol; 2-(2-ethoxy ethoxy)ethanol; 2-(2-butoxy ethoxy)ethanol; 2-(2-methoxy ethoxy)-ethanol; 2-methoxy ethanol; 2-butoxy ethanol; 2-ethoxy ethanol; 2-butoxy propanol; 2-butoxy ethoxy propanol and the propoxy propanols; also useful are known glycols including ethylene and propylene glycols, and glycol derivatives such as ethylene glycol mono-methyl ether and propylene glycol monomethyl ether. Various combinations of the foregoing solvents may also be utilized. Preferred stabilizing solvents useful for the present invention include methanol, ethanol, isopropanol, butanol, ethylene glycol monomethyl ether, and propylene glycol monomethyl ether. The stabilizing solvent is typically utilized in an amount ranging from about 10 to 100, preferably from about 30 to 50, parts by weight per 100 parts by weight of total monomers. The stabilizing solvent is typically vacuum-stripped from the latex after the emulsion polymerization so as to avoid the presence of any volatile material in the final latex. In the case of higher boiling solvents, the solvent may remain in the latex so as to yield a latex which does not require post polymerization stripping.

In carrying out the emulsion polymerization with the preferred stabilizing solvent to produce the latex of the present invention, other optional ingredients may be employed during the polymerization process. For example, conventional anionic and/or nonionic surfactants may optionally be utilized in order to aid in the formation of the latex. Typical anionic surfactants include carboxylates, such as fatty acid soaps from lauric, stearic, and oleic acid; acyl derivatives of sarcosine, such as methyl glycine; sulfates, such as sodium laurel sulfate; sulfated natural oils and esters, such as Turkey Red Oil; alkyl aryl polyether sulfates; alkali alkyl sulfates; ethoxylated aryl sulfonic acid salts; alkyl aryl polyether sulfonates; isopropyl naphthalene sulfonates; sulfosuccinates; phosphate esters, such as short chain fatty alcohol partial esters of complex phosphates; and orthophosphate esters of polyethoxylated fatty alcohols. Typical nonionic surfactants include ethoxylated (ethylene oxide) derivatives, such as ethoxylated alkyl aryl derivatives; mono- and polyhydric alcohols; ethylene oxide/propylene oxide block copolymers; esters, such as glyceryl monostearate; products of the dehydration of sorbitol, such as sorbitan monostearate and polyethylene oxide sorbitan monolaurate; amines; lauric acid; and isopropenyl halide. A conventional surfactant, if utilized, is employed in an amount ranging from about 0.01 to 15, preferably from about 0.1 to 5 parts by weight per 100 parts by weight of total monomer.

Chain transfer agents may also be employed with the stabilizing solvent during the preferred emulsion polymerization of the present invention in order to control the molecular weight of the butadiene polymers and to modify the physical properties of the resultant polymers as is known in the art. Any of the conventional organic sulfur-containing chain transfer agents may be utilized such as alkyl mercaptans, dialkyl xanthogen disulfides and sodium thioglycolate. Typical alkyl mercaptans include dodecyl mercaptan, octyl mercaptan, tert-dodecyl mercaptan, tridecyl mercaptan, and mixtures of mercaptans derived from coconut oil (often called lauryl mercaptan), with dodecyl mercaptan being preferred.

The dialkyl xanthogen disulfides can be represented by the structure

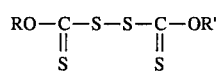

wherein R and R' independently are alkyl radicals having 1–8 carbon atoms. Examples of suitable alkyl radicals are methyl, ethyl, propyl, isopropyl, and the various isomeric butyl, amyl, hexyl, heptyl and octyl radicals. The preferred dialkyl xanthogen disulfides are those in which each alkyl radical has 1–4 carbon atoms, especially diisopropyl xanthogen disulfide.

A chain transfer agent, if utilized, is typically employed in an amount ranging from about 0.1 to 2, preferably from about 0.2 to 1, parts by weight per 100 parts by weight of total monomer.

As stated above, the formation of the stable latices of the present invention is preferably carried out by emulsion polymerizing the appropriate monomers in the presence of the polyvinyl alcohol and the stabilizing solvent. Specifically, an aqueous emulsification mixture of water, the polyvinyl alcohol and the stabilizing solvent, is formed to which is added the appropriate monomers. The emulsification mixture typically contains from about 40 to 80, preferably about 50 to 70, percent by weight of water.

The preferred emulsion polymerization with the stabilizing solvent of the present invention is typically triggered by a free radical initiator. Typical free radical initiators useful in the present invention include conventional redox systems, peroxide systems, azo derivatives, and hydroperoxide systems. The use of a redox system is presently preferred for use in the invention and examples of such redox systems include ammonium persulfate/sodium metabisulfite, ferric sulfate/ascorbic acid/hydroperoxide and tributylborane/hydroperoxide. Presently, the most preferred redox system utilizes $(NH_4)_2S_2O_8$ (ammonium persulfate) and $Na_2S_2O_5$ (sodium metabisulfite). When utilizing this particular redox system, the $Na_2S_2O_5$ is utilized to prepare the emulsification mixture. The $(NH_4)_2S_2O_8$ is then added to the emulsification mixture along with the appropriate monomers to initiate polymerization. Both the $Na_2S_2O_5$ and the $(NH_4)_2S_2O_8$ are utilized in an amount ranging from about 0.1 to 3, preferably about 0.2 to 1, parts by weight per 100 parts by weight of total monomer.

The preferred emulsion polymerization with the stabilizing solvent is typically carried out at a temperature in the range from about 30° to 90° C., preferably about 40° to 60° C. Monomer conversion typically ranges from about 70 to 100 percent, preferably from about 80 to 100 percent.

The polyvinyl alcohol-stabilized butadiene latices of the present invention typically have a solids content of between about 30 and 70 percent, more typically between about 40 and 60 percent; a viscosity of between about 50 and 10,000 centipoise, preferably between about 100 and 1,000 centipoise; and a particle size between about 100 and 300 nanometers. The butadiene polymer of the latex typically has a molecular weight of between about 3,000 and about 300,000, preferably between about 35,000 and 100,000 Mn.

The polyvinyl alcohol-stabilized butadiene latices of the invention may also be prepared according to methods such as those disclosed in U.S. Pat. Nos. 3,920,600 and 4,128,514; and in British Patent No. 1,469,993.

The polyvinyl alcohol-stabilized butadiene polymer latex is typically utilized in the adhesive composition of the present invention in an amount ranging from about 50 to 99, preferably from about 80 to 97 percent by weight of the essential components of the adhesive composition. "Essential components of the adhesive composition" herein refers to the polyvinyl alcohol-stabilized butadiene polymer latex and the methylene donor compound described hereinafter.

The methylene donor compound of the present invention can essentially be any compound which is compatible with the other ingredients of the adhesive composition and which is capable of forming a methylene bridge or linkage between the free hydroxyl groups of the polyvinyl alcohol-stabilized butadiene latex at elevated temperatures. Typical elevated temperatures at which the methylene donor compound is capable of forming methylene bridges are in the range from about 140° C. to 175° C. Examples of methylene donor compounds useful in the present invention include hexamethylene tetramine, paraformaldehyde, s-trioxane, anhydroformaldehydeaniline, ethylene diamine formaldehyde, methylol derivatives of urea and formaldehyde, acetaldehyde, furfural, methylol phenolic compounds, and the like.

The methylene donor compounds of the invention are preferably high molecular weight aldehyde homopolymers or copolymers. Typical high molecular weight aldehyde homopolymers and copolymers include (1) acetal homopolymers; (2) acetal copolymers; (3) gamma-polyoxymethylene ethers having the characteristic structure:

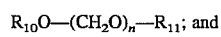

$R_{10}O—(CH_2O)_n—R_{11}$; and (4) polyoxymethylene glycols having the characteristic structure:

$HO—(R_{12}O)_x—(CH_2O)_n—(R_{13}O)_x—H$;

wherein $R_{10}$ and $R_{11}$ can be the same or different and each is an alkyl group having from 1 to 8, preferably 1 to 4, carbon atoms; $R_{12}$ and $R_{13}$ can be the same or different and each is an alkylene group having from 2 to 12, preferably 2 to 8, carbon atoms; n is greater than 100, and is preferably in the range from about 200 to about 2000; and x is in the range from 0 to 8, preferably 1 to 4, with at least one x being equal to at least 1. The high molecular weight aldehyde homopolymers and copolymers are further characterized by a melting point of at least 75° C., i.e., they are substantially inert with respect to the polyvinyl alcohol-stabilized latex until heat activated; and by being substantially completely insoluble in water at a temperature below the melting point. The acetal homopolymers and acetal copolymers are well-known articles of commerce. The polyoxymethylene materials are also well known and can be readily synthesized by the reaction of monoalcohols having from 1 to 8 carbon atoms or dihydroxy glycols and ether glycols with polyoxymethylene glycols in the presence of an acidic catalyst. A representative method of preparing the polyoxymethylene materials is also described in U.S. Pat. No. 2,512,950, which is incorporated herein by reference. Gamma-polyoxymethylene ethers are the preferred methylene donor compounds of the present invention and a particularly preferred methylene donor compound for use in the practice of the invention is 2-polyoxymethylene dimethyl ether.

The methylene donor compounds of the present invention are typically utilized in an amount ranging from about 1 to 50, preferably from about 3 to 20, percent by weight of the essential components of the adhesive composition.

The adhesive compositions of the present invention may utilize one or more various optional ingredients selected from the group consisting of a supplemental polymeric film-forming component, a nitroso compound crosslinker, a maleimide compound crosslinker, a vulcanizing agent, an acid-scavenging compound and other additives, all of which are described in more detail hereinbelow.

In addition to the polyvinyl alcohol-stabilized butadiene latices, the adhesive compositions of the present invention may contain a supplemental polymeric film-forming component which is preferably a latex of a halogenated polyolefin. The halogenated polyolefin of the latex can essentially be any natural or synthetic halogenated polyolefin elastomer. The halogens employed in the halogenated polyolefinic elastomer are typically chlorine or bromine, although fluorine can also be used. Mixtures of halogens can also be employed in which case the halogen-containing polyolefinic elastomer will have more than one type of halogen substituted thereon. The amount of halogen does not appear critical and can range from as low as about 3 weight percent to more than 70 weight percent, depending on the nature of the base elastomer or polymer. Halogenated polyolefins and their preparation are well-known to those skilled in the art.

Representative halogenated polyolefins include chlorinated natural rubber, chlorine- and bromine-containing synthetic rubbers including polychloroprene, chlorinated polychloroprene, chlorinated polybutadiene, hexachloropentadiene, butadiene/halogenated cyclic conjugated diene adducts, chlorinated butadiene styrene copolymers, chlorinated ethylene propylene copolymers and ethylene/propylene/non-conjugated diene terpolymers, chlorinated polyethylene, chlorosulfonated polyethylene, brominated poly(2,3-dichloro-1,3-butadiene), copolymers of α-haloacrylo-nitriles and 2,3-dichloro-1,3-butadiene, chlorinated poly(vinyl chloride), and the like, including mixtures of such halogen-containing elastomers. Thus substantially any of the known halogen-containing derivatives of natural and synthetic elastomers can be employed in the practice of this invention, including mixtures of such elastomers.

The latex of the halogenated polyolefin of the present invention can be prepared according to methods known in the art such as by dissolving the halogenated polyolefin in a solvent and adding a surfactant to the resulting solution. Water can then be added to the solution under high shear to emulsify the polymer. The solvent is then stripped to obtain a latex having a total solids content of from about 10 to 60, preferably 25 to 50, percent by weight. The latex can also be prepared by emulsion polymerization of chlorinated ethylenically unsaturated monomers.

Although less preferred, the supplemental polymeric film-forming component may also be a latex, dispersion, emulsion or other aqueous form of a non-halogenated polymeric material. Examples of such non-halogenated polymeric materials which may be utilized in aqueous form include epoxy resins, phenolic resins, resorcinol resins, melamine resins, styrene-butadiene copolymer rubber, natural rubber, polyacrylates, polybutadienes and polyvinylacetates. It should be noted that in addition to acting as a supplemental film-former, an epoxy resin may also act as an acid-scavenging compound as described hereinafter.

If employed, the supplemental polymeric film-forming component of the present invention is typically utilized in an amount ranging from about 0.1 to 50, preferably from about 5 to 20 percent by dry weight (excluding solvent and water) of the total adhesive composition.

The adhesive compositions of the present invention may also contain a nitroso compound crosslinker. The nitroso compound crosslinker may be a nitroso compound per se, or a nitroso compound precursor. The nitroso compound useful as an nitroso compound crosslinker of the present invention can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The present preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds, unless otherwise specified.

Particularly preferred nitroso compounds are characterized by the formula:

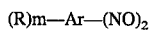

$(R)_m$—Ar—$(NO)_2$ wherein Ar is selected from the group consisting of phenylene and naphthalene; R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from I to 8 carbon atoms; and m is zero, 1, 2, 3, or 4, and preferably is zero.

A partial non-limiting listing of nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl- 1,4-dinitrosobenzene, 2-methyl-5-chloro- 1,4-dinitrosobenzene, 2-fluoro- 1,4-dinitrosobenzene, 2-methoxy- 1-3-dinitroso-benzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitroso-benzene.

The nitroso compound precursor which can function as a nitroso compound crosslinker for purposes of the present invention may be essentially any compound that is capable of being converted, typically by oxidation, to a nitroso compound at elevated temperatures, typically in the range from about 140° C. to 200° C. The most common nitroso compound precursors are derivatives of quinone compounds. Examples of quinone compound derivatives useful as nitroso compound precursors in the present invention include quinone dioxime, dibenzoquinone dioxime, 1,2,4,5-tetrachlorobenzoquinone, 2-methyl-l,4-benzoquinone dioxime, 1,4-naphthoquinone dioxime, 1,2-naphthoquinone dioxime, and 2,6-naphthoquinone dioxime.

If employed, the nitroso compound crosslinker is typically utilized in an amount ranging from about 0.1 to 50, preferably from about 2 to 35, percent by dry weight of the total adhesive composition.

The adhesive composition of the present invention may also contain a maleimide compound crosslinker. The maleimide compound crosslinker can essentially be any compound containing at least two maleimide groups. The maleimide groups may be attached to one another or may be joined to and separated by an intervening divalent radical such as alkylene, cyclo-alkylene, epoxydimethylene, phenylene (all 3 isomers), 2,6-dimethylene-4-alkylphenol, or sulfonyl. An example of a maleimide compound wherein the maleimide groups are attached to a phenylene radical is m-phenylene bismaleimide and is available as HVA-2 from E. I. Du Pont de Nemours & Co.

The maleimide compound crosslinker may also be an aromatic polymaleimide compound. Aromatic polymaleimides having from about 2 to 100 aromatic nuclei wherein no more than one maleimide group is directly attached to each adjacent aromatic ring are preferred. Particularly preferred aromatic polymaleimide compounds have the formula:

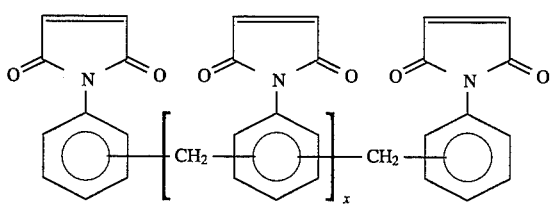

wherein x is from about 0 to 100. Such aromatic polymaleimides are common materials of commerce and are sold under different trade names by different companies, such as BMI-M-20 and BMI-S aromatic polymaleimides supplied by Mitsui Toatsu Fine Chemicals, Incorporated.

If employed, the maleimide compound crosslinker is typically utilized in the present invention in an amount ranging from about 2 to 50, preferably from about 5 to 15, percent by dry weight of the total adhesive composition.

The adhesive compositions of the present invention may also contain a vulcanizing agent. The vulcanizing agent of the present invention can be any known vulcanizing agent which is capable of crosslinking elastomers at molding temperatures (140°–200° C). Preferred vulcanizing agents for use in the invention are selenium, sulphur, and tellurium, with selenium being most preferred.

If employed, the vulcanizing agent is typically utilized in the present invention in an amount ranging from about 1 to 15, preferably from about 2 to 7, percent by dry weight of the total adhesive composition.

The adhesive compositions of the present invention may also contain an acid-scavenging compound for purposes of consuming any acid compound by-products produced during the bonding process. The acid-scavenging compound is preferably a metal oxide or a lead-containing compound. The metal oxide of the present invention can be any known metal oxide such as the oxides of zinc, cadmium, magnesium, lead, and zirconium; litharge; red lead; zirconium salts; and combinations thereof. Various lead-containing compounds may also be utilized as an acid-scavenging compound in lieu of, or in addition to, the metal oxide. Examples of such lead-containing compounds include lead salts such as polybasic lead salts of phosphorous acid and saturated and unsaturated organic dicarboxylic acids and acid anhydrides. Specific examples of lead salts include dibasic lead phthalate, monohydrous tribasic lead maleate, tetrabasic lead fumarate, dibasic lead phosphite, and combinations thereof. Other examples of lead-containing compounds include basic lead carbonate, lead oxide and lead dioxide. For environmental reasons, metal oxides are preferred over lead-containing compounds for purposes of the invention.

If employed, the acid-scavenging compound is typically utilized in an amount ranging from about 0.1 to 40, preferably from about 5 to 30, percent by dry weight of the total adhesive composition.

The adhesive compositions of the present invention can optionally contain contain other well-known additives including plasticizers, fillers, pigments, surfactants, dispersing agents, wetting agents, reinforcing agents and the like, in amounts employed by those skilled in the adhesive arts to obtain a desired color and consistency. Examples of optional ingredients include carbon black, silica such as fumed silica, sodium aluminosilicate, and titanium dioxide.

The adhesive compositions of the present invention may be prepared by any method known in the art, but are preferably prepared by combining and milling or shaking the ingredients and water in a ball-mill, sand-mill, ceramic bead-mill, steel bead-mill, high speed media-mill, or the like.

The adhesive compositions may be applied to a surface to be bonded by spraying, dipping, brushing, wiping, roll-coating or the like, after which the adhesive composition is permitted to dry. The adhesive composition is typically applied in an amount sufficient to form a dry film thickness ranging from about 0.1 to 1.0 mils, preferably from about 0.2 to 0.8 mils. In the case of a two-coat adhesive composition as described more fully hereinafter, the adhesive is applied in a similar manner over the prime coat which has been permitted to completely dry.

The adhesive compositions of the present invention are capable of bonding any substrate or surface capable of receiving the adhesive composition. The material, which may be bonded to a surface such as a metal surface in accordance with the present invention, is preferably a polymeric material, including any elastomeric material selected from any of the natural rubbers and olefinic synthetic rubbers including polychloro-prene, polybutadiene, neoprene, styrene-butadiene copolymer rubber, acrylonitrile-butadiene copolymer rubber, ethylene-propylene copolymer rubber, ethylene-propylene-diene terpolymer rubber, butyl rubber, brominated butyl rubber, alkylated chlorosulfonated polyethylene and the like. The material may also be a thermoplastic elastomer such as the thermoplastic elastomers sold under the tradenames SANTOPRENE and ALCRYN by Monsanto and DuPont, respectively. The material is most preferably an elastomeric material such as natural rubber (cis-polyisoprene). The surface to which the material is bonded can be any surface capable of receiving the adhesive such as a glass, plastic, or fabric surface, and is preferably a metal surface selected from any of the common structural metals such as iron, steel (including stainless steel), lead, aluminum, copper, brass, bronze, MONEL metal alloy (Huntington Alloy Products Div., International Nickel Co., Inc.), nickel, zinc, and the like. Prior to bonding, a metal surface is typically cleaned according to one or more methods known in the art such as degreasing, grit-blasting and zinc-phosphatizing.

The present adhesive compositions are preferably utilized to bond an elastomeric material to a metal surface. The adhesive composition is typically applied to the metal surface and the coated metal surface and elastomeric substrate are then brought together under heat and pressure to complete the bonding procedure. In some cases, it may be desirable to preheat the metal surface prior to application of the adhesive composition to assist in drying of the adhesive composition. The coated surface of the metal and the elastomeric substrate are typically brought together under a pressure of from about 20.7 to 172.4 Mega Pascals (MPa), preferably from about 20 MPa to 50 MPa. The resulting rubber-metal assembly is simultaneously heated to a temperature of from about 140° C. to about 200° C., preferably from about 150° C. to 170° C. The assembly should remain under the applied pressure and temperature for a period of from about 3 minutes to 60 minutes, depending on the cure rate and thickness of the rubber substrate. This process may be carried out by applying the rubber substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The adhesive compositions prepared in accordance with the present invention can be effectively employed in adhesives, coatings, and the like. The compositions of the present invention are preferably utilized in an aqueous adhesive system for bonding an elastomeric substrate to a metal surface or for bonding an elastomeric substrate to a fabric surface such as textile cloth or cord. The present adhesive compositions have a particular affinity for elastomeric substrates, and when utilized in an adhesive system, should be applied at least in substantial contact with the elastomeric substrate. "At least in substantial contact" herein refers to at least minimum physical contact between the adhesive composition and the elastomeric substrate.

The metal surface to which the elastomeric substrate may be bonded may optionally have a conventional water-based or solvent-based metal primer applied thereto. Typical water-based primers include phenolic resin-type primers such as CHEMLOK 802, CHEMLOK 805, CHEMLOK 8006, and CHEMLOK 8401 produced by Lord Corporation. Typical solvent-based primers include phenolic resin-type primers such as CHEMLOK 205 or CHEMLOK 207 produced by Lord Corporation. The adhesive composition is typically applied directly to a metal surface or directly to any primer which has been applied to the metal so as to ensure contact between the adhesive composition and the elastomeric substrate which is brought into contact with the coated metal surface. The fabric surface to which the elastomeric substrate may be bonded may have a conventional resorcinol-formaldehyde/latex (RFL) primer applied thereto.

The following examples are disclosed in order to further illustrate and fully disclose the invention and are not intended to limit in any manner the scope of the invention which is defined by the claims.

Example 1

Preparation of Polyvinyl Alcohol-Stabilized Latex

A polyvinyl alcohol-stabilized dichlorobutadiene/α-bromoacrylonitrile copolymer latex is prepared with the following ingredients (PHM= parts per hundred parts monomer):

| Ingredient | Weight (g) | PHM |
| --- | --- | --- |
| 2,3-dichloro-1,3-butadiene (90% in $CH_2Cl_2$) | 656.0 | 82.0 |
| α-bromoacrylonitrile | 144.0 | 18.0 |
| Polyvinyl alcohol | 56.0 | 7.0 |
| Deionized water | 1056.0 | 132.0 |
| Methanol | 400.0 | 50.0 |
| $(NH_4)_2S_2O_8$ | 4.0 | 0.5 |
| $Na_2S_2O_5$ | 4.0 | 0.5 |

The polyvinyl alcohol, methanol, $Na_2S_2O_5$ and 856 gms of water are added to a 3 L flask equipped with stirring, $N_2$, heat and a condenser. The mixture is heated to 50° C., after which the two monomers and the $(NH_4)_2S_2O_8$ dissolved in the remaining water are added over a 1 hour period. The resulting latex is vacuumed-stripped for 1 hour at 80 mmHg and 50° C. to remove the methanol. The latex has a monomer conversion of a solids content of 42.8% and a viscosity of 300 centipoise.

Preparation of Adhesive Composition

The following ingredients are milled for 30 minutes in a ceramic bead mill (PHL=parts per hundred dry latex):

| Ingredient | Weight (g) | PHL |
| --- | --- | --- |
| 2-polyoxymethylene dimethylether | 20.0 | 10.0 |

-continued

| Ingredient | Weight (g) | PHL |
| --- | --- | --- |
| p-Dinitrosobenzene | 10.0 | 5.0 |
| Selenium | 10.0 | 5.0 |
| Carbon black | 10.0 | 5.0 |
| Wetting agent[a] | 0.08 | 0.04 |
| Dispersing agent[b] | 0.44 | 0.22 |

[a]ZONYL FSN (E. I. Du Pont de Nemours & Co.)
[b]MARASPERSE CBOS-4 (American Can Company)

To the resulting mill base is then added 100 parts (200 g) of the latex prepared above and a sufficient amount of water and ammonium hydroxide (for pH adjustment) to give an adhesive composition having a 40 percent solids content at a pH of approximately 7.

Adhesive Tests

A conventional aqueous primer (CHEMLOK 8006—Lord Corporation) is sprayed onto grit-blasted steel coupons preheated to 120° to 140° F. at a film thickness of 0.3 to 0.5 mils. The adhesive composition prepared above is then spray applied to the primed metal coupons, also warmed to 120° to 140° F., at a film thickness of 0.5 to 0.7 mils. The coated coupons are then bonded to HC-100 (natural rubber) substrate by injection molding the rubber onto the coated coupons at 320° F. and then vulcanizing the elastomer at 320° F. for 15 minutes. Some of the coupons are exposed to pre-bake or pre-cure heat conditions. When pre-baked, the parts are exposed to the molding temperature for a period of 3 or 6 minutes before the rubber is injected into the cavity. This simulates actual production conditions and helps determine if the adhesive remains active enough to successfully bond the rubber compound. The bonded rubber-metal assemblies are then subjected to the tests described below.

Primary Adhesion

Bonded parts are pulled to destruction according to ASTM Test D429— Method B. Parts are tested in peel with a peel angle of 45 degrees. The test is conducted at room temperature with a test speed of 20 inches per minute. After the bonded part fails, the percent rubber retention on the adhesive coated area of the part are measured.

72-Hour Salt Spray

Bonded parts are buffed on the edges with a grinding wheel. The rubber is then tied back over the metal with stainless steel wire so as to stress the bonded area. This exposes the bond line to the environment. Failure is initiated by scoring the bond line with a razor blade. The parts are then strung on stainless steel wire and placed in a salt spray chamber. The environment inside the chamber is 100° F., 100 percent relative humidity, and 5 percent dissolved salt in the spray, which is dispersed throughout the chamber. The parts remain in this environment for 72 hours. Upon removal, the rubber is peeled from the metal with pliers. The percent rubber retention on the part is then measured.

The results of the above tests are set forth in Table 1 below. In the data, reference is made to failure in the rubber body (R). Failure is expressed in terms of percent, and a high percent of failure in the rubber is desirable since this indicates that the adhesive bond is stronger than the rubber itself.

TABLE 1

| Test | Pre-Bake Time (min.) | % Rubber Failure |
| --- | --- | --- |
| Primary Adhesion | 0 | 100R |

TABLE 1-continued

| Test | Pre-Bake Time (min.) | % Rubber Failure |
|---|---|---|
| | 3 | 100R |
| | 6 | 100R |
| 72-Hour Salt Spray | 0 | 78R |
| | 3 | 81R |
| | 6 | 85R |

Additional Testing of Example 1

Buffer Testing

This test involves the bonding of metal buffers to measure adhesion in a high-stress configuration by distributing forces over the entire bond line during testing. Metal buffers are 1-inch diameter buttons with a slightly concave surface which has been grit-blasted. Bonded assemblies are prepared by injection molding rubber to opposing buffers with 1 inch of rubber molded between them. The buffers are pulled in tension until failure, and the tensile load and the percent rubber failure are measured.

Metal buffers are coated with the primer and adhesive compositions in a manner identical to that described above for the coupons in Example 1. The coated metal buffers are then injection molded with HC-100 (natural rubber) for 15 minutes at 300° F. and with HC-202 (styrene-butadiene copolymer rubber) for 20 minutes at 320° F. The bonded parts are pulled to destruction at a rate of 20 inches per minute and the results are given below in Table 2. The pull value represents the amount of force (in pounds) required to separate one of the buffers from the molded rubber substrate.

TABLE 2

| Rubber Substrate | Pull Value | % Rubber Failure |
|---|---|---|
| HC-100 | 1350 | 93R |
| HC-202 | 1425 | 99R |

Extended Salt Spray Tests

The bonded rubber metal coupons prepared in Example 1 are also subjected to extended salt spray exposure covering periods of 0, 1, 3, 5, 7, 10, 15, and 20 days. The percent rubber failure after exposure to these extended periods is given below in Table 3.

TABLE 3

| Time of Exposure (days) | % Rubber Failure |
|---|---|
| 0 | 100R |
| 1 | 100R |
| 3 | 100R |
| 5 | 100R |
| 7 | 97R |
| 10 | 72R |
| 15 | 55R |
| 20 | 44R |

Example 2

An adhesive composition is prepared in accordance with Example 1 except that the following amounts of ingredients used to prepare the polyvinyl alcohol-stabilized latex differ from that of Example 1.

| Ingredient | Weight (g) | PHM |
|---|---|---|
| 2,3-dichloro-1,3-butadiene (90% in $CH_2Cl_2$) | 760.0 | 95.0 |
| α-bromoacrylonitrile | 40.0 | 5.0 |
| Polyvinyl alcohol | 56.0 | 7.0 |

Example 3

An adhesive composition is prepared in accordance with Example 1 except that the following amounts of ingredients used to prepare the polyvinyl alcohol-stabilized latex differ from that of Example 1.

| Ingredient | Weight (g) | PHM |
|---|---|---|
| 2,3-dichloro-1,3-butadiene (90% in $CH_2Cl_2$) | 720.0 | 90.0 |
| α-bromoacrylonitrile | 80.0 | 10.0 |
| Polyvinyl alcohol | 56.0 | 7.0 |

Bonded rubber-to-metal coupons are prepared in accordance with Example 1 utilizing the adhesive compositions of Examples 1, 2, and 3, except that the coated coupons are bonded to HC-100 (natural rubber), HC-130 (heat-resistant semi-EV natural rubber), and HC-109 (soft semi-EV natural rubber) by injection molding the rubber onto the coated coupons at 320° F. for 15 minutes, 10 minutes, and 10 minutes, respectively, for each rubber substrate. The bonded parts are then tested according to the primary adhesion test described above and the results are given below in Table 4.

TABLE 4

| Example | Elastomer | Pre-Bake | % Rubber Failure |
|---|---|---|---|
| 1 | HC-100 | 0' | 100 |
| 1 | HC-100 | 3' | 100 |
| 1 | HC-100 | 6' | 100 |
| 1 | HC-130 | 0' | 100 |
| 1 | HC-130 | 3' | 100 |
| 1 | HC-130 | 6' | 100 |
| 1 | HC-109 | 0' | 100 |
| 1 | HC-109 | 3' | 100 |
| 1 | HC-109 | 6' | 100 |
| 2 | HC-100 | 0' | 100 |
| 2 | HC-100 | 3' | 100 |
| 2 | HC-100 | 6' | 100 |
| 2 | HC-130 | 0' | 100 |
| 2 | HC-130 | 3' | 100 |
| 2 | HC-130 | 6' | 100 |
| 2 | HC-109 | 0' | 100 |
| 2 | HC-109 | 3' | 100 |
| 2 | HC-109 | 6' | 100 |
| 3 | HC-100 | 0' | 100 |
| 3 | HC-100 | 3' | 100 |
| 3 | HC-100 | 6' | 100 |
| 3 | HC-130 | 0' | 100 |
| 3 | HC-130 | 3' | 61 |
| 3 | HC-130 | 6' | 62 |
| 3 | HC-109 | 0' | 100 |
| 3 | HC-109 | 3' | 100 |
| 3 | HC-109 | 6' | 100 |

Example 4

An adhesive composition is prepared in accordance with Example 1 except that the following ingredients are utilized in combination with the polyvinyl alcohol-stabilized latex.

| Ingredient | Weight (g) | PHL |
| --- | --- | --- |
| Hexamethylene tetramine | 10.0 | 5.0 |
| Quinone dioxime | 8.0 | 4.0 |
| Selenium | 10.0 | 5.0 |
| Zinc oxide | 28.0 | 14.0 |
| Carbon black | 10.0 | 5.0 |
| Wetting agent[a] | 0.2 | 0.1 |
| Dispersing agent[b] | 0.50 | 0.25 |

[a]ZONYL FSN (E. I. Du Pont de Nemours & Co.)
[b]MARASPERSE CBOS-4 (American Can Company)

Metal coupons are bonded in accordance with the procedure in Example 1 to HC-100, HC-109, HC-202, and HC-106 (semi-EV natural rubber) rubber substrates with pre-bake times of 0, 3, and 6 minutes. The results of the primary adhesion test for these bonded assemblies is given below in Table 5.

TABLE 5

| Rubber Substrate | Pre-Bake | Pull Value # | % Rubber Failure |
| --- | --- | --- | --- |
| HC-109 | 0' | 39 | 92R |
| HC-109 | 3' | 39 | 100R |
| HC-109 | 6' | 40 | 100R |
| HC-100 | 0' | 65 | 100R |
| HC-100 | 3' | 65 | 100R |
| HC-100 | 6' | 67 | 100R |
| HC-106 | 0' | 58 | 100R |
| HC-106 | 3' | 64 | 100R |
| HC-106 | 6' | 63 | 100R |
| HC-202 | 0' | 107 | 100R |
| HC-202 | 3' | 99 | 100R |
| HC-202 | 6' | 99 | 100R |

The adhesive composition of this example is also utilized to bond buffers according to the buffer testing procedure of Example 1 utilizing HC-106 and HC-202 rubber substrates with pre-bake times of 0, 3, and 6 minutes. The results of the primary adhesion tests for the buffers are given below in Table 6.

TABLE 6

| Rubber Substrate | Pre-Bake | Pull Value # | % Rubber Failure |
| --- | --- | --- | --- |
| HC-106 | 0' | 1021 | 84R |
| HC-106 | 3' | 951 | 83R |
| HC-106 | 6' | 532 | 61R |
| HC-202 | 0' | 823 | 100R |
| HC-202 | 3' | 1006 | 100R |
| HC-202 | 6' | 843 | 98R |

Example 5

The adhesive composition of Example 4 is utilized in combination with a conventional aqueous primer (CHEMLOK 8401—Lord Corporation) to bond buffers according to the above procedure. The buffers are used to bond to HC-100 rubber substrate and are tested for primary adhesion, stressed boiling water resistance for 2 hours, and stressed salt spray resistance for 72 hours. The buffers are stressed by elongating the buffer 30 percent in a jig and holding the 30 percent elongation throughout the test. After testing, the buffers are pulled in tension to failure and the pull values and percent rubber failure are recorded. The results of the test are given below in Table 7.

TABLE 7

| Test | Pull Value # | % Rubber Failure |
| --- | --- | --- |
| Primary Adhesion | 1237 | 98R |
| 2-Hour Boiling Water | 1269 | 87R |
| 72-Hour Salt Spray | 1025 | 98R |

Example 6

A polyvinyl alcohol-stabilized latex is prepared in accordance with Example 2 and is formulated into an adhesive composition according to the procedure of Example 1 with the following ingredients.

| Ingredient | Weight (g) | PHL |
| --- | --- | --- |
| 2-polyoxymethylene dimethylether | 26.6 | 13.3 |
| Chlorosulfonated polyethylene latex[a] | 13.4 | 6.7 |
| Epoxy resin dispersion[b] | 13.4 | 6.7 |
| p-dinitrosobenzene | 26.6 | 13.3 |
| Zinc oxide | 26.6 | 13.3 |

[a]HYPALON 605 (Burke Palmison Chemical Company)
[b]W55-5003 (Rhone-Poulanc)

The adhesive composition is prepared according to the procedure in Example 1 with a sufficient amount of water to give a 35 percent solids content. Grit-blasted metal coupons are then dip-coated with a conventional solvent-based primer (CHEMLOK 205—Lord Corporation) at a film thickness of 0.3 to 0.5 mils and air dried for one hour. The adhesive composition is then sprayed onto the primed metal coupons warmed to 160° F. at a film thickness of 0.3 mils. The coated coupons are then bonded to HC-106 and HC-109 rubber substrates by compression molding at 320° F. with pre-bake times of 0, 5, and 10 minutes. The bonded rubber-to-metal assemblies are then tested for primary adhesion, 200° F. hot tear resistance, and 2-hour boiling water resistance. The 200° F. hot tear resistance is identical to the primary adhesion test except the bonded assemblies are first placed in a chamber heated to 200° F. for 15 minutes. The results of the tests are given below in Table 8.

TABLE 8

| Elastomer | Test | Pre-Bake | % Rubber Failure |
| --- | --- | --- | --- |
| HC-106 | Primary Adhesion | 0 | 100R |
| HC-106 | 2-Hr. Boiling Water | 0 | 100R |
| HC-106 | 200° F. Hot Tear | 0 | 100R |
| HC-109 | Primary Adhesion | 0 | 100R |
| HC-109 | 2-Hr. Boiling Water | 5 | 100R |
| HC-109 | 200° F. Hot Tear | 10 | 100R |

Example 7

A dichlorobutadiene/α-bromoacrylonitrile copolymer latex is prepared with the following ingredients:

| Ingredient | Weight (g) | PHM |
| --- | --- | --- |
| 2,3-dichloro-1,3-butadiene (90% in $CH_2Cl_2$) | 190.0 | 95.0 |
| α-bromoacrylonitrile | 10.0 | 5.0 |
| Polyvinyl alcohol | 14.0 | 7.0 |
| Deionized water | 316.5 | 158.25 |
| Propylene glycol monomethyl ether[a] | 30.0 | 15.0 |
| $(NH_4)_2S_2O_8$ | 0.384 | 0.192 |
| $Na_2S_2O_5$ | .44 | .22 |
| Sodium thioglycolate | .2 | .1 |

-continued

| Ingredient | Weight (g) | PHM |
|---|---|---|

(a)DOWANOL PM (Dow Chemical Company)

The latex is prepared in a manner identical to that of Example 1 except that the mixture is heated to 45° C. and the monomers are added over a 2-hour period. Also, the solvent is allowed to remain in the resulting latex. The latex prepared above is then formulated into an adhesive composition according to the procedure of Example 1, utilizing the following ingredients.

| Ingredient | Weight (g) | PHM |
|---|---|---|
| Hexamethylene tetramine | 12.0 | 6.0 |
| Chlorosulfonated polyethylene(a) | 19.8 | 9.9 |
| Quinone dioxime | 9.6 | 4.8 |
| Polymaleimide(b) | 15.0 | 7.5 |
| Zinc oxide | 34.0 | 17.0 |
| Dispersing agent(c) | 0.66 | 0.33 |

(a)CSM 450 (Sumitomo Seika Ltd.)
(b)BMI-M-20 (Mitsui Toatsu Fine Chemicals, Inc.)
(c)MARASPERSE CBOS-4 (American Can Company)

The adhesive composition prepared above is coated onto cords of polyester which have been primed with a conventional RFL latex dip. The coated cords are then heat treated for 2.5 minutes at 280° F. and then embedded into a pad of alkylated chlorosulfonated polyethylene (ACSIUM—E. I. Du Pont de Nemours & Co.) and cured in a compression mold for 40 minutes at 320° F. After bonding, the resulting assemblies are then heat aged at 140° C. for 0, 3.5, and 7 days. After aging, the polyester cords are pulled at a 90° peel angle from the cured pad and the rubber retention is measured.

Comparative Example 8

Polyester cords are prepared, bonded and tested according to Example 7 except that the RFL latex dip is utilized without the adhesive composition. The results of the tests for Examples 7 and 8 are shown below in Table 9.

TABLE 9

| Example | Heat Age (days) | Rubber Failure |
|---|---|---|
| 7 | 0 | 100R |
| 7 | 3.5 | 100R |
| 7 | 7 | 100R |
| 8 | 0 | 100R |
| 8 | 3.5 | 0R |
| 8 | 7 | 0R |

As can be seen from the above data, the adhesive compositions of the present invention avoid the use of environmentally detrimental solvents to provide excellent adhesive bonds which exhibit substantial stability with respect to exposure to high temperature fluids and corrosive materials.

What is claimed is:

1. An adhesive composition comprising a polyvinyl alcohol-stabilized butadiene polymer latex and a methylene donor compound wherein the butadiene polymer latex is prepared by an emulsion polymerization in the presence of polyvinyl alcohol.

2. An adhesive composition according to claim 1 wherein the butadiene polymer is a homopolymer, copolymer or terpolymer prepared by polymerizing one or more monomers selected from the group consisting of butadiene monomers and copolymerizable monomers.

3. An adhesive composition according to claim 2 wherein the butadiene monomers are selected from the group consisting of 2,3-dichloro-1,3-butadiene; 1,3-butadiene; 2,3-dibromo-1,3-butadiene; isoprene; 2,3-dimethylbutadiene; chloroprene; bromoprene; 2,3-dibromo-1,3-butadiene; 1,1,2-trichlorobutadiene; cyanoprene; and hexachlorobutadiene.

4. An adhesive composition according to claim 2 wherein the copolymerizable monomers are selected from the group consisting of α-bromoacrylonitrile, α-chloroacrylonitrile, acrylic acid and methacrylic acid.

5. An adhesive composition according to claim 2 wherein the butadiene polymer is a homopolymer of 2,3-dichloro-1,3-butadiene.

6. An adhesive composition according to claim 2 wherein the butadiene polymer is a copolymer of 2,3-dichloro-1,3-butadiene; and α-bromoacrylonitrile or α-chloroacrylonitrile.

7. An adhesive composition according to claim 2 wherein the butadiene polymer is a terpolymer of 2,3-dichloro-1,3-butadiene; α-bromoacrylonitrile or α-chloroacrylonitrile; and acrylic or methacrylic acid.

8. An adhesive composition according to claim 1 wherein the butadiene polymer latex is prepared by an emulsion polymerization in the presence of polyvinyl alcohol and a stabilizing solvent.

9. An adhesive composition according to claim 8 wherein the stabilizing solvent is an organic alcohol solvent capable of exhibiting miscibility with water.

10. An adhesive composition according to claim 9 wherein the solvent is selected from the group consisting of methanol, ethanol, isopropanol, butanol, ethylene glycol monomethyl ether, and propylene glycol monomethyl ether.

11. An adhesive composition comprising
a polyvinyl alcohol-stabilized butadiene polymer latex, wherein the butadiene polymer latex is prepared by an emulsion polymerization in the presence of polyvinyl alcohol; and
a methylene donor compound which is selected from the group consisting of (1) acetal homopolymers; (2) acetal copolymers; (3) gamma-polyoxy-methylene ethers having the structure:

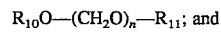

$R_{10}O$—$(CH_2O)_n$—$R_{11}$; and (4) polyoxymethylene glycols having the structure:

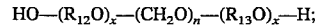

$HO$—$(R_{12}O)_x$—$(CH_2O)_n$—$(R_{13}O)_x$—$H$;

wherein $R_{10}$ and $R_{11}$ can be the same or different and each is an alkyl group having from 1 to 8 carbon atoms; $R_{12}$ and $R_{13}$ can be the same or different and each is an alkylene group having from 2 to 12 carbon atoms; n is greater than 100; and x is in the range from 0 to 8 with at least one x being equal to at least 1.

12. An adhesive composition according to claim 11 wherein the methylene donor compound is a gamma-polyoxymethylene ether.

13. An adhesive composition according to claim 12 wherein the gamma-polyoxymethylene ether is 2-polyoxymethylene dimethyl ether.

14. An adhesive composition according to claim 1 wherein the polyvinyl alcohol-stabilized butadiene polymer latex is present in an amount ranging from 50 to 99 percent by weight and the methylene donor compound is present in an amount ranging from 1 to 50 percent by weight, based on the total weight of the polyvinyl alcohol-stabilized butadiene polymer latex and the methylene donor compound.

15. An adhesive composition according to claim 14 wherein the polyvinyl alcohol-stabilized butadiene polymer latex is present in an amount ranging from 80 to 97 percent by weight and the methylene donor compound is present in an amount ranging from 3 to 20 percent by weight, based on the total weight of the polyvinyl alcohol-stabilized butadiene polymer latex and the methylene donor compound.

16. An adhesive composition consisting essentially of a polyvinyl alcohol-stabilized butadiene polymer latex and a methylene donor compound, wherein the butadiene polymer latex is prepared by an emulsion polymerization in the presence of polyvinyl alcohol.

17. An adhesive composition according to claim 2 wherein the copolymerizable monomers are selected from the group consisting of $\alpha$-bromoacrylonitrile and $\alpha$-chloroacrylonitrile.

* * * * *

UNITED STATES PATENT AND TRADEMARK OFFICE
CERTIFICATE OF CORRECTION

PATENT NO. : 5,496,884
DATED : March 5, 1996
INVENTOR(S) : Weih, et-al.

It is certified that error appears in the above-indentified patent and that said Letters Patent is hereby corrected as shown below:

On the title page, item:

[75]: Delete "Patrick A. Warren, Erie; Douglas H. Mowrey, Pleasantville".

Signed and Sealed this

Eighteenth Day of June, 1996

Attest:

BRUCE LEHMAN

*Attesting Officer*    *Commissioner of Patents and Trademarks*